(12) United States Patent
Netschke et al.

(10) Patent No.: US 6,204,851 B1
(45) Date of Patent: Mar. 20, 2001

(54) APPARATUS AND METHOD FOR APPLYING EFFECTS TO GRAPHICAL IMAGES

(75) Inventors: Gregory W. Netschke, Huntsville, AL (US); Gabriel Cuellar; Gabriel Manana, both of Bogota' (CO)

(73) Assignee: Intergraph Corporation, Huntsville, AL (US)

( * ) Notice: Subject to any disclaimer, the term of this patent is extended or adjusted under 35 U.S.C. 154(b) by 0 days.

(21) Appl. No.: 09/054,964

(22) Filed: Apr. 3, 1998

Related U.S. Application Data

(60) Provisional application No. 60/042,694, filed on Apr. 4, 1997.

(51) Int. Cl.[7] .................................................. G06T 15/00
(52) U.S. Cl. ......................... 345/419; 345/430; 345/433
(58) Field of Search ........................... 345/121, 123–131, 345/328, 418, 419, 425, 429, 430, 951

(56) References Cited

U.S. PATENT DOCUMENTS

| | | | | |
|---|---|---|---|---|
| 5,432,900 | * | 7/1995 | Rhodes et al. ........................ | 395/154 |
| 5,592,602 | * | 1/1997 | Edmunds et al. ..................... | 395/174 |
| 5,727,192 | * | 3/1998 | Baldwin .............................. | 395/522 |
| 5,764,228 | * | 6/1998 | Baldwin .............................. | 345/344 |
| 5,764,243 | * | 6/1998 | Baldwin .............................. | 345/506 |
| 5,798,770 | * | 8/1998 | Baldwin .............................. | 345/506 |
| 5,831,637 | * | 11/1998 | Young et al. ........................ | 345/501 |
| 5,835,096 | * | 11/1998 | Baldwin .............................. | 345/430 |
| 5,960,213 | * | 9/1999 | Wilson ................................ | 395/822 |

FOREIGN PATENT DOCUMENTS

| | | | |
|---|---|---|---|
| 0 811954A2 | * | 6/1997 | (EP) . |
| 0 811 954 A2 | | 12/1997 | (EP) . |
| WO 95/34051 | * | 12/1995 | (WO) . |
| 1247/194 WO | * | 3/1998 | (WO) . |

OTHER PUBLICATIONS

Caramba User's Manual, "Source Application for Vizfx," Manual Version 1.0, Jul. 31, 1995.
Caramba User's Manual, Camaleon Graphics Software, Jul. 31, 1995.*

* cited by examiner

*Primary Examiner*—Mark R. Powell
*Assistant Examiner*—G. T. Cunningham
(74) *Attorney, Agent, or Firm*—Bromberg & Sunstein LLP

(57) ABSTRACT

An apparatus and method of applying an effect to graphical data utilizes a graphics processor to apply the effect to a graphical image having the graphical data. To that end, the graphics processor is configured to process graphical data in accordance with a preselected graphics processing format, and the effect and graphical image are defined and converted, respectively, into the preselected graphics processing format. The graphics processor is controlled to apply the effect to the graphical image to produce an output graphical image. The output graphical image includes both the effect and the graphical image. The graphics processor may be a graphics accelerator card, and the graphics processing format may be the OPENGL™ application program interface.

39 Claims, 3 Drawing Sheets

APPARATUS AND METHOD FOR APPLYING EFFECTS TO GRAPHICAL IMAGES

PRIORITY

This application claims priority from provisional application Ser. No. 60/042,694, filed Apr. 4, 1997, entitled "APPARATUS AND METHOD FOR VIDEO COMPOSITING" and bearing, which is incorporated herein, in its entirety, by reference.

FIELD OF THE INVENTION

The invention generally relates to computer graphical production devices and, more particularly, the invention relates to applying effects to graphical images on a computer system.

BACKGROUND OF THE INVENTION

Special effects ("effects") commonly are added to graphical images in a motion picture by means of conventional graphical editing application programs such as, for example, ADOBE PREMERE™, available from Adobe Systems Incorporated of San Jose, Calif. Such programs may include known effects such as, for example, zooming, rotating, and trimming. Edited motion pictures often may be previewed in a playback window on the computer system.

The functionality provided by conventional graphical editing programs, however, typically requires extensive utilization of the central processing unit and random access memory within the computer system. More particularly, the central processing unit performs all of the calculations required to apply effects to graphical images. After these calculations are completed by the central processor, the edited graphical image may be directed to a graphics accelerator for display on a display device. One such graphics accelerator is the REALIZM™ video card, available from Intergraph Corporation of Huntsville, Ala. Such graphics accelerator utilizes the commonly known OPENGL™ application program interface (available from Silicon Graphics, Inc. of Mountain View, Calif.) to display the edited graphical image. For more information relating to OPENGL™, See, for example, *Inside OLE*, two-dimensional. Ed., by Kraig Brockschmidt (Microsoft press 1995); *The OPENGL Technical Library*, which contains *The OPENGL Programming Guide* (ISBN: 0-201-63276-4), and *The OPENGL Reference Manual* (ISBN: 0-201-46140-4), by the OPENGL Architecture Review Board; *The OPENGL Graphics System: A Specification*, Version 1.0 et seq., by Silicon Graphics, Inc. (1992); *Microsoft OPENGL Installable Client Driver Specification*, Microsoft Corporation; *Computer Graphics Principles and Practice*, by Foley van Dam (Addison-Wesley 1996); *OPENGL Programming Guide*, (ISBN: 0-201-46138-2), by the OPENGL Architecture Review Board. These related documents are incorporated herein, in their entireties, by reference.

Utilizing the central processing unit for performing such calculations, however, undesirably slows computer system performance. The art has responded to this problem by providing one or more dedicated co-processors for performing the necessary calculations. Although typically more efficient than utilizing the central processing unit, co-processors are expensive, thus increasing the cost of editing graphical images with such graphical image editing programs. Moreover, co-processors typically are difficult to program.

SUMMARY OF THE INVENTION

In accordance with one aspect of the invention, an apparatus and method of applying an effect to graphical data utilizes a graphics processor to apply the effect to a graphical image having the graphical data. To that end, the graphics processor is configured to process graphical data in accordance with a preselected graphics processing format, and the effect and graphical image are defined and converted, respectively, into the preselected graphics processing format. In accordance with preferred embodiments of the invention, the graphics processor is controlled to apply the effect to the graphical image to produce an output graphical image. The output graphical image includes both the effect and the graphical image. In preferred embodiments, the graphics processor is a graphics accelerator card, and the graphics processing format is In accordance with other aspects of the invention, the computer system includes a central processing unit, in addition to the graphics processor. The effect may be applied to the graphical image so that the effect is normalized with respect to the graphical image. Specifically, the effect may be applied to the graphical image as a ratio of the size of the graphical image. Moreover, the output graphical image may be stored in volatile or non-volatile memory in the computer system as a frame or other type of graphical image. Alternatively, the effect may be applied to the graphical image within texture memory that is a part of the graphics processor. The texture may be the graphics processor format for the input image.

In yet other embodiments, the effect may include an initial effect and a final effect. In preferred embodiments, the effect may be applied to the graphical image by interpolating between the initial effect and the final effect to provide a continuous effect. The graphical image may be any known graphical image that may be converted into computer readable form. For example, the graphical image may be a video image having a plurality of fields, or a motion picture having a plurality of frames.

Preferred embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF SPECIFIC EMBODIMENTS

In accordance with preferred embodiments of the invention, a graphics accelerator configured for use with the OPENGL™ application program interface (a/k/a OPENGL™ format) applies an effect that is in the OPENGL™ format to a graphical image that also is in the OPENGL™ format. Details of preferred and other embodiments are discussed below.

Figure 1:
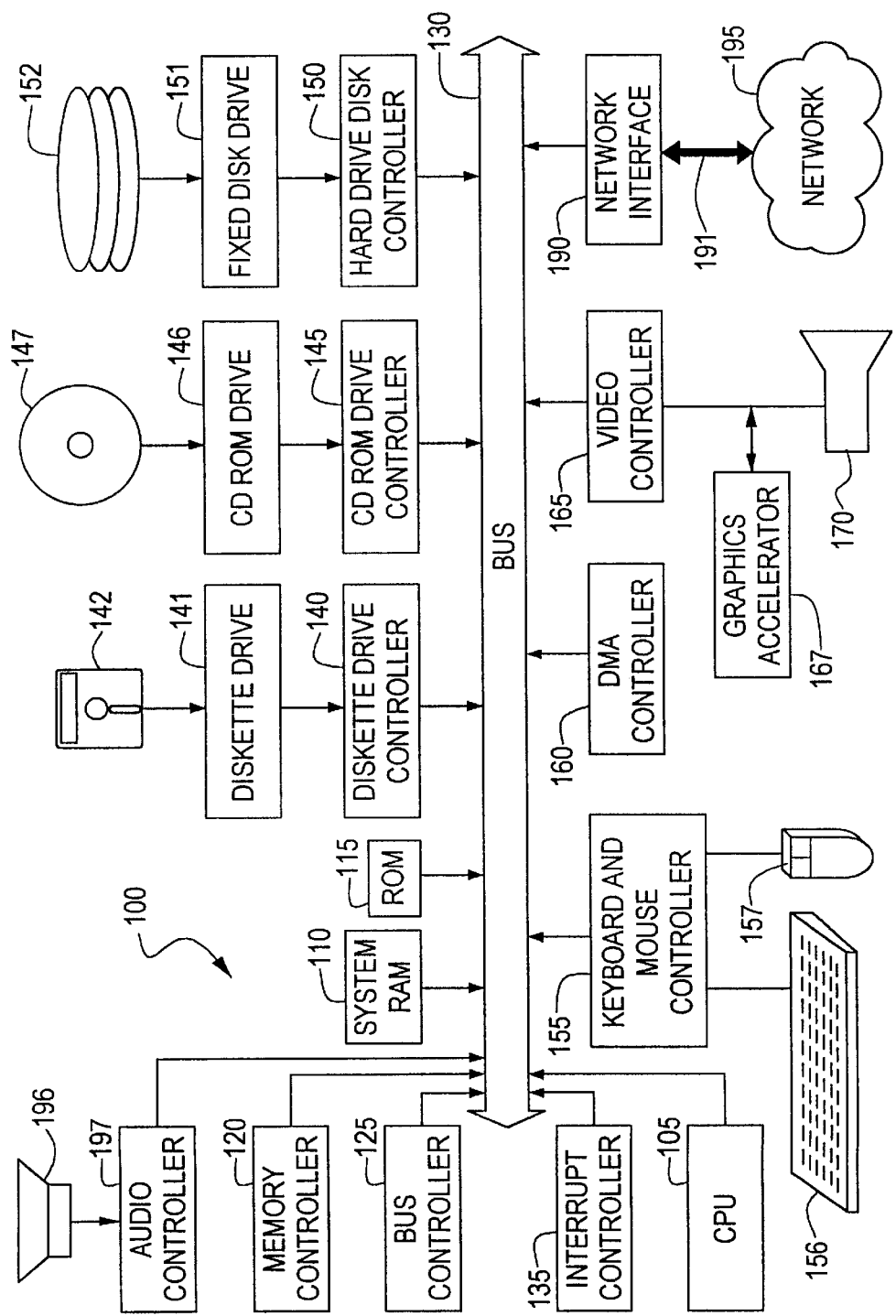
FIG. 1 schematically shows an exemplary computer system that may be utilized with a preferred embodiment of the invention.

FIG. 1 illustrates the system architecture for an exemplary computer system 100, such as an Integraph model number TDZ2000 computer system (available from Integraph Corporation of Huntsville, Ala.), on which the disclosed method and apparatus for applying effects to graphical data can be implemented. The exemplary computer system of FIG. 1 is discussed for descriptive purposes only, however, and should not be considered a limitation of the invention. Although the description below may refer to terms commonly used in describing particular computer systems, the described concepts apply equally to other computer systems, including systems having architectures that are dissimilar to that shown in FIG. 1.

The computer 100 includes a central processing unit (CPU) 105 having a conventional microprocessor, random access memory (RAM) 110 for temporary storage of information, and read only memory (ROM) 115 for permanent storage of read only information. A memory controller 100 is provided for controlling system RAM 110. A bus controller 125 is provided for controlling a bus 130, and an interrupt controller 135 is provided for receiving and processing various interrupt signals from the other system components.

Mass storage may be provided by known non-volatile storage media, such as a diskette 142, a digital versatile disk (not shown), a CD-ROM 147, or a hard disk 152. Data and software may be exchanged with the computer system 100 via removable media, such as the diskette 142 and the CD-ROM 147. The diskette 142 is insertable into a diskette drive 141, which utilizes a diskette drive controller 140 to interface with the bus 130. Similarly, the CD-ROM 147 is insertable into a CD-ROM drive 146, which utilizes a CD-ROM drive controller 145 to interface with the bus 130. Finally, the hard disk 152 is part of a fixed disk drive 151, which utilizes a hard drive controller 150 to interface with the bus 130.

User input to the computer 100 may be provided by a number of devices. For example, a keyboard 156 and a mouse 157 may be connected to the bus 330 by a keyboard and mouse controller 155. An audio transducer 196, which may act as both a microphone and a speaker, is connected to the bus 130 by audio controller 197. It should be obvious to those reasonably skilled in the art that other input devices, such as a pen and/or tablet and a microphone for voice input, may be connected to computer 100 through bus 130 and an appropriate controller. A direct memory access (DMA) controller 160 is provided for performing direct memory access to system RAM 110. A visual display may be generated by a video controller 165, which controls a graphics accelerator 167 and a display device 170. In preferred embodiments, the graphics accelerator is a REALIZM™ video card, available from Intergraph Corporation of Huntsville, Ala. As is known in the art, the REALIZM™ video card is configured for use with the OPENGL™ application program interface ("API") for rendering three dimensional ("3D") images on the display device 170.

A network adapter 190 also may be included to enable the computer system 100 to be interconnected to a network 195 via a network bus 191. The network 195, which may be a local area network (LAN), a wide area network (WAN), or the Internet, may utilize general purpose communication lines that interconnect a plurality of network devices.

The computer system 100 preferably is controlled and coordinated by operating system software, such as the WINDOWS NT® operating system (available from Microsoft Corp., of Redmond, Washington). Among other computer system control functions, the operating system controls allocation of system resources and performs tasks such as process scheduling, memory management, networking, and I/O services. As suggested above, the operating system preferably includes an OPENGL application program interface for rendering non-trivial 3D graphical indicia on the display device 170.

Figure 2:
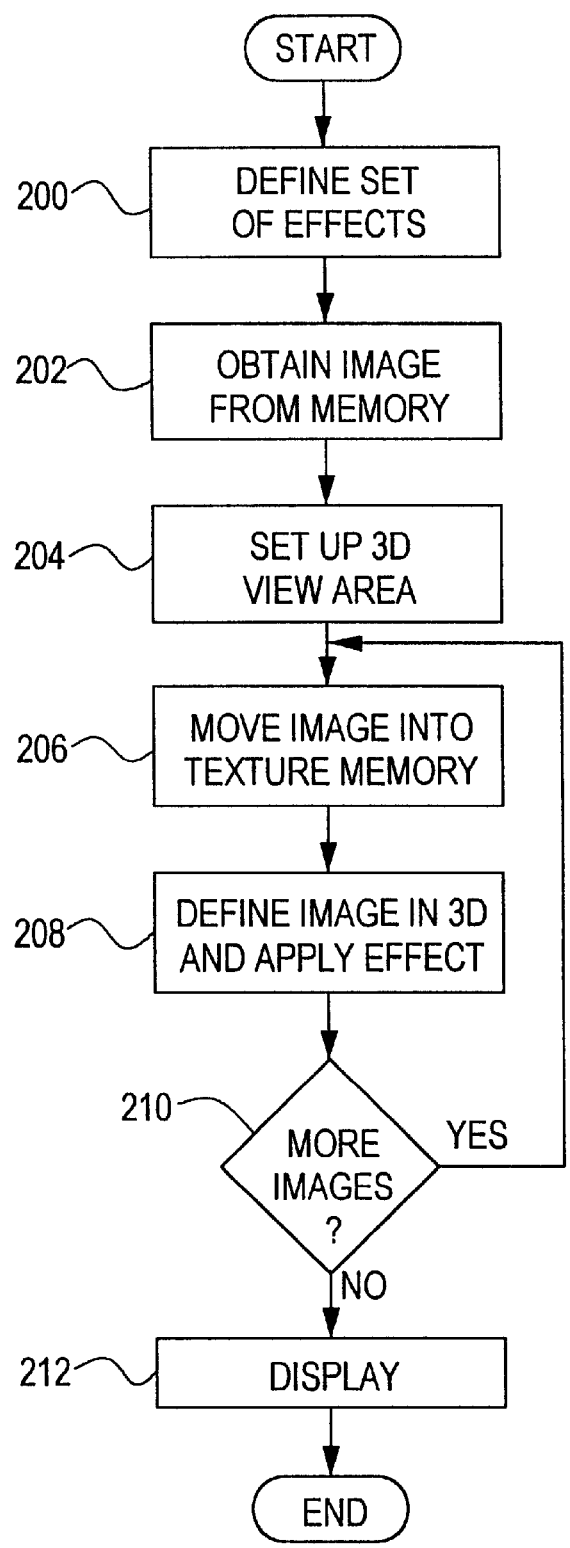
FIG. 2 shows a process of applying special effects to a graphical image in accordance with a preferred embodiment of the invention.

FIG. 2 shows a process of applying special effects to a graphical image in accordance with a preferred embodiment of the invention. The process begins at step 200 in which a set of effects is defined in accord with the OPENGL™ format, and then stored in the non-volatile memory 152. These effects may include unique effects created by a programmer, or commonly known effects. Some commonly known effects include geometry transformations that change the shapes of images without changing the image colors, (e.g., "BUMP", "CROP", "DEFORM", and "ROTATE"), "BALLOON", and "SHINES." Additional known effects may include "CONCENTRIC BLINDS", "DISPLACEMENT", "RADAR BLINDS", "TOKYO BLINDS" and "VENETIAN BLINDS."

In preferred embodiments, effects may be edited and/or combined with other effects to produce yet additional effects. An effect preferably is defined by first developing a prototype of the effect. Such prototype preferably includes a program written in any known programming language (e.g., the C++ programming language) utilizing the OPENGL™ API and WINDOWS NT™ API. In preferred embodiments, effects are designed to manipulate the 3D geometry of graphical images and their applied textures in OPENGL™ to obtain a desired output image result. Once satisfactorily developed, the (effect) program is configured to interface with the particular application program with which it is to be utilized.

The process then continues to step 202 in which a graphical image to be manipulated is obtained from memory. The image may be read from a file or generated from graphical software. The formatting data for the graphical image can comply with any graphical format and thus, does not necessarily comply with the OPENGL™ API. For example, the graphical image may be a video image from a live feed (i.e., having fields and requiring field rendering), a frame or plurality of frames in a motion picture (e.g., an avi file stored on disk), a bitmap file, or a graphic image file (i.e., a .gif tile). Such images may be three dimensional, two-dimensional, or one dimensional mapped representations of an image on a two-dimensional medium (i.e., the display device).

Once the image is obtained, a 3D view area is set up in accord with conventional processes (step 204) and then the graphical image is moved into texture memory on the graphics accelerator (step 206). The following OPENGL™ functions may be used to move the image into texture memory:

glTexEnvi;
glTexParameteri;
glEnable; and
glTexImage2D.

The image then is defined in a 3D geometry and the texture is applied to it to produce an affected output image (step 208). More particularly, the geometry of the image is manipulated by the application of the texture by the OPENGL™ graphical accelerator 167 to produce the affected output image in 3D. The shape of the 3D image being manipulated, its alignment relative to the view volume, and the manner of mapping the texture to the 3D geometry determine the content of the affected output image. Of course, the calculations for applying the effect to the converted graphical image are performed by the graphical accelerator 167 and not by the central processing unit 105. The OPENGL™ functions that may be utilized for step 208 include:

glBegin;
glTexCoord3d;
glVertex2d or glVertex3d;
glEnd;
glEnable; and
glDisable.

It then is determined at step 210 if effects are to be applied to additional images and combined with the output image from step 208. The positioning of the different affected 3D output images relative to one another in the view volume determines the interaction between images. The process loops to step 206 if effects are to be applied to additional images. If not, then the process moves to step 212 in which the image is displayed via a frame buffer capture operation. More particularly, the output image preferably is written to a frame buffer and consequently, displayed on the display device 170. An immediate display of this type is preferable, for example, to preview the application of an effect in an editing process. In some embodiments, however, such as those that do not require a preview, the OPENGL™ capture of the output image from the frame buffer is performed in a hidden window. More particularly, the window attributes may be set so that the output image will not be displayed on the display device 170. In other embodiments in which the OPENGL™ API is not utilized, a hidden window may not be necessary. The OPENGL functions that may be used for step 212 include:

glFlush;
glReadBuffer; and
glReadPixels.

In preferred embodiments of the invention, effects are normalized to be applied to a converted graphical image as a ratio of the size of the converted graphical image. Specifically, rather than specifying an effect with respect to a measurement of the image (e.g., inches or pixels), the effect may be specified as a percentage of the size of the image. For example, for a well known "SPHERIZE" effect, the center of the converted image first may be determined and the effect may process twenty percent of the image extending radially from such center location. Accordingly, preferred embodiments of the invention may apply effects to images having different sizes and still provide consistent output images.

Multiple effects may be applied to a single graphical image. Most graphical accelerators, however, have a maximum texture size that can be applied to an image. Accordingly, multiple textures for an input image may be mapped into an array associated with the graphical image.

Effects also may be applied to large images requiring a significant amount of memory by utilizing tiling techniques. More particularly, an input image may be divided (i.e., tiled) into two or more separate images that each are sized to be within the memory constraints of the computer system 100. Once tiled, the effects may be applied to each tile so that when the image is reassembled, the effect is applied to the entire image in a unitary manner. Only the portion of the effect that would be applied to a particular section of the overall image (i.e., within a tile) is applied to an individual tile. For example, if a swirl effect is applied to a large source image, such image may be broken up into four separate tiles (i.e., quadrants). The tiles are arrayed on a 3D geometry such that when the 3D geometry is swirled, the swirl appears to be a single swirl that was applied to the overall image. The boundaries between each of the tiles preferably are imperceptible by utilizing conventional anti-aliasing techniques.

Tiling techniques also may be utilized to reduce the resolution of a high resolution graphical image that is to be displayed on a lower resolution display device. To that end, the input graphical image may be tiled in accord with the resolution of the display device, and then reassembled for display.

As noted above, effects may be applied to a series of frames in a motion picture. For example, a "ROTATE" effect may rotate a three-dimensional graphical image in a three-dimensional space. In preferred embodiments, a starting position of the graphical image and an ending position of the graphical image (in the three-dimensional space) may be pre-set without any provision as to the positions of the image between such starting and ending position. To that end, in addition to applying the effect to the starting and ending frames, preferred embodiments of the invention calculate incremental effect changes and accordingly apply the effect to the intermediate frames in the motion picture. Assuming the graphical image is a cube, for example, preferred embodiments of the invention may determine the location of the cube in each intermediate frame of the motion picture between the starting and ending positions. Additional attributes of such intermediate frames such as, for example, shading and light reflections, also are calculated and applied to provide a higher quality display.

Figure 3:
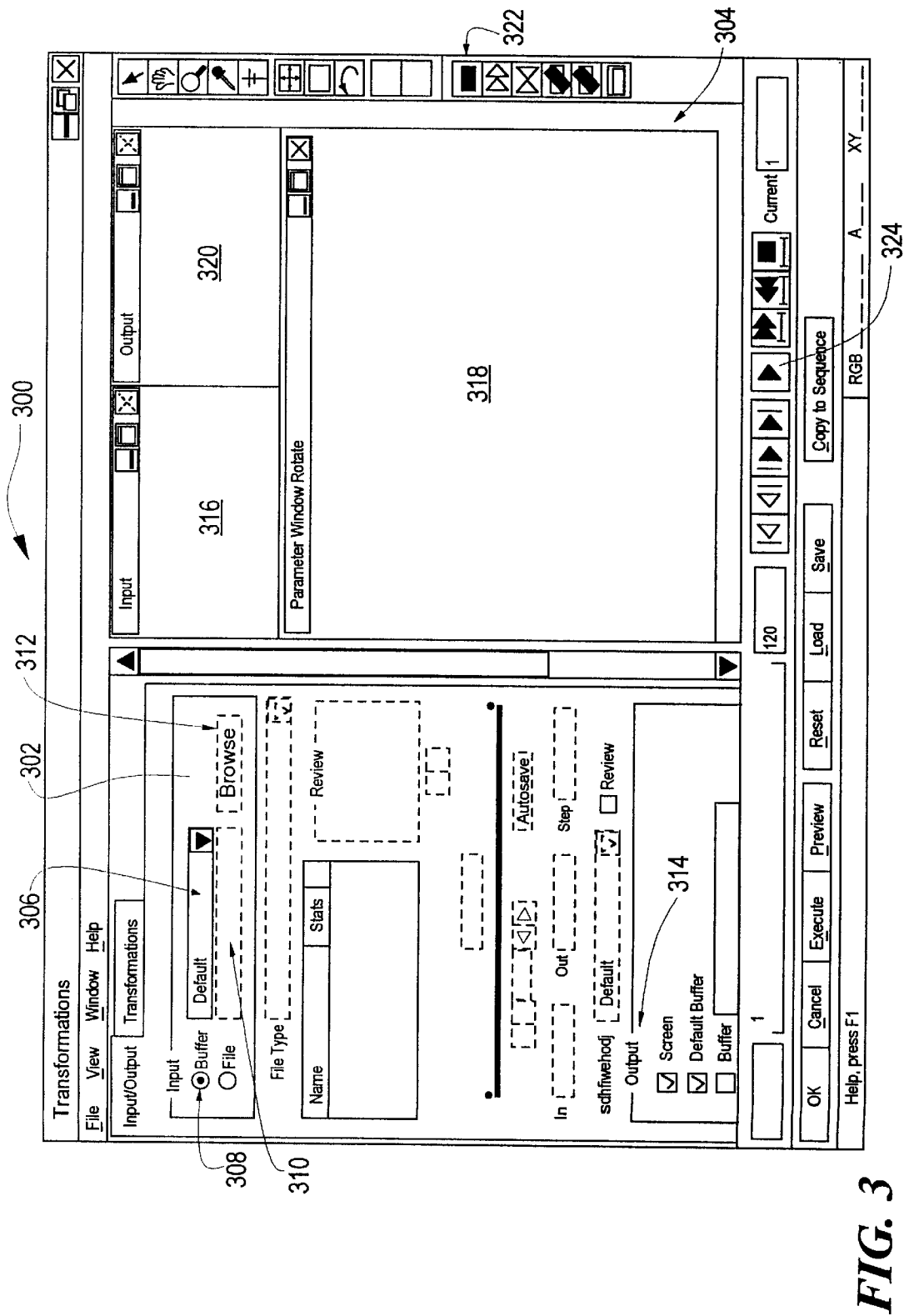
FIG. 3 shows a graphical user interface that may be utilized to apply effects to a graphical image in accordance with a preferred embodiment of the invention.

FIG. 3 shows a graphical user interface ("interface 300") that may be utilized to apply effects to a graphical image in accordance with a preferred embodiment of the invention. To that end, the interface 300 includes an Input/Output page 302 for setting system parameters, and a viewing area 304 showing the effect, input image, and output image. More particularly, the Input/Output page 302 includes a plurality of fields that may be configured by a user editing an input graphical image. Each of those fields is discussed below.

A buffer field 306 indicates the buffer from which the input graphical image is to be received. Each output image also may be configured to he input for application of additional effects. The buffer field 306 includes a radio button 308 that activates the field 306. In preferred embodiments, the buffer field 306 has a default bufier that operates like a stack.

A file field 310 indicates the file from which to import the graphical image. In a manner similar to the buffer field 306, the file field 310 also includes a radio button 312 that activates the field 310. A file name may be written directly into this field 310, or a plurality of other files may be browsed via a browse button 313 for selection into this field 310.

An output field 314 indicates where the output image is to be displayed and/or stored. In particular, the output image may be displayed on the screen, or saved to either of the default buffer or a buffer selected by the user.

The interface 300 also includes a preview area 315 having three windows. Specifically, the preview area 315 includes an input window 316 for displaying the input graphical image, a parameter window 318 to preview and edit the output image (and effect) prior to saving in nonvolatile memory, and an output window 320 to display the output image that is to be saved in non-volatile memory 152. The interface 300 also includes a tool bar 322 that may be utilized to edit the effect in the parameter window 318. The tool bar 322 operates in accordance with conventional processes. The parameter window 318 also includes a timeline controller 324 that enables a user to move along a number of frames in an effect. The timeline controller 324 is configured to operate in a manner similar to controls of a tape recorder.

In an alternative embodiment, the disclosed apparatus and method for applying effects to graphical images may be implemented as a computer program product for use with a computer system. Such implementation may include a series of computer instructions fixed either on a tangible medium, such as a computer readable media (e.g., a diskette, CD-ROM, ROM, or fixed disk) or transmittable to a computer system, via a modem or other interface device, such as a communications adapter connected to a network over a medium. Medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

It should be noted that although preferred embodiments of the invention have been discussed as using the OPENGL™ format, it is contemplated that other three dimensional and two dimensional graphical formats may be utilized to apply effects to input images. For example, a graphics accelerator configured for use with the well known DIRECT3D™ graphical display API (available from Microsoft Corp.) may be used for such purposes. Accordingly, discussion of the OPENGL™ format is not intended to limit the scope of the invention.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A computer program product for use on a computer system for applying effects to graphical data on a computer system, the computer system having a graphics processor that is preconfigured to process graphical data in accordance with a preselected graphics processing format, the computer program product comprising a computer usable medium having computer readable program code thereon, the computer readable program code including:

program code for defining an effect in the preselected graphics processing format;

program code for converting a graphical image into the preselected graphics processing format; and program code for controlling the graphics processor to apply the effect to the graphical image to produce an output graphical image, the output graphical image being the result of the application of the effect to the graphical image, wherein the graphics processor includes resident texture memory, the program code for converting including program code for storing the converted graphical image in the resident texture memory.

2. The computer program product as defined by claim 1 wherein the graphics processor is a graphics accelerator card.

3. The computer program product as defined by claim 1 wherein the preselected graphics processing format is OPENGL™.

4. The computer program product as defined by claim 1 wherein the computer system includes a central processing unit.

5. The computer program product as defined by claim 1 wherein the program code for controlling comprises:

program code for normalizing the effect with respect to the graphical image.

6. The computer program product as defined by claim 1 wherein the graphical image has a size, the program code for controlling comprising:

program code for applying the effect to the graphical image as a ratio of the size of the graphical image.

7. The computer program product as defined by claim 1 wherein the computer system includes memory, the computer program product further comprising:

program code for storing the output graphical image in memory.

8. The computer program product as defined by claim 1 wherein the graphical image is a frame.

9. The computer program product as defined by claim 1 wherein the effect is defined as the rendering of a view of a textured 3D object.

10. The computer program product as defined by claim 1 wherein the program code for defining comprises:

program code for defining an initial effect and a final effect.

11. The computer program product as defined by claim 10 wherein the program code for controlling comprises:

program code for interpolating between the initial effect and the final effect to render a plurality of output graphical images.

12. The computer program product as defined by claim 1 wherein the graphical image comprises fields in a video signal.

13. The computer program product as defined by claim 1 wherein the graphical image is a plurality of frames in a motion picture.

14. An apparatus for applying effects to graphical data on a computer system, the computer system having a graphics processor that is preconfigured to process graphical data in accordance with a preselected graphics processing format, the apparatus comprising:

means for defining an effect in the preselected graphics processing format;

means for converting a graphical image into the preselected graphics processing format;

a controller for controlling the graphics processor to apply the effect to the graphical image to produce an output graphical image, the output graphical image being the result of the application of the effect to the graphical image, wherein the graphics processor includes resident texture memory, the means for converting comprising means for storing the converted graphical image in the resident texture memory.

15. The apparatus as defined by claim 14 wherein the graphics processor is a graphics accelerator card.

16. The apparatus as defined by claim 14 wherein the preselected graphics processing format is OPENGL™.

17. The apparatus as defined by claim 14 wherein the computer system includes a central processing unit.

18. The apparatus as defined by claim 14 wherein the controller comprises:

means for normalizing the effect with respect to the graphical image.

19. The apparatus as defined by claim 14 wherein the graphical image has a size, the controller comprising:

means for applying the effect to the graphical image as a ratio of the size of the graphical image.

20. The apparatus as defined by claim 14 wherein the computer system includes memory, the apparatus further comprising:

means for storing the output graphical image in memory.

21. The apparatus as defined by claim 14 wherein the graphical image is a frame.

22. The apparatus as defined by claim 14 wherein the effect is defined as the rendering of a view of a textured 3D object.

23. The apparatus as defined by claim 14 wherein the means for defining comprises:

means for defining an initial effect and a final effect.

24. The apparatus as defined by claim 23 wherein the converter comprises:

means for interpolating between the initial effect and the final effect to render a plurality of output graphical images.

25. The apparatus as defined by claim 14 wherein the graphical image comprises fields.

26. The apparatus as defined by claim 14 wherein the graphical image is a plurality of frames in a motion picture.

27. A method of applying effects to graphical data on a computer system, the computer system having a graphics processor that is preconfigured to process graphical data in accordance with a preselected graphics processing format, the method comprising:

A. defining an effect in the preselected graphics processing format;

B. converting a graphical image into the preselected graphics processing format;

C. controlling the graphics processor to apply the effect to the graphical image to produce an output graphical image, the output graphical image being the result of the application of the effect to the graphical image, wherein the graphics processor includes resident texture memory, step B comprising storing the converted graphical image in the resident texture memory.

28. The method as defined by claim 27 wherein the graphics processor is a graphics accelerator card.

29. The method as defined by claim 27 wherein the preselected graphics processing format is OPENGL™.

30. The method as defined by claim 27 wherein the computer system includes a central processing unit.

31. The method as defined by claim 27 wherein step C comprises:

C1. normalizing the effect with respect to the graphical image.

32. The method as defined by claim 27 wherein the graphical image has a size, step C comprising:

C2. applying the effect to the graphical image as a ratio of the size of the graphical image.

33. The method as defined by claim 27 wherein the computer system includes memory, the method further comprising:

D. storing the output graphical image in memory.

34. The method as defined by claim 27 wherein the graphical image is a frame.

35. The method as defined by claim 27 wherein the effect is defined as the rendering of a view of a textured 3D object.

36. The method as defined by claim 27 wherein step A comprises:

A1. defining an initial effect and a final effect.

37. The method as defined by claim 36 wherein step C comprises:

C3. interpolating between the initial effect and the final effect to render a plurality of output graphical images.

38. The method as defined by claim 27 wherein the graphical image comprises fields.

39. The method as defined by claim 27 wherein the graphical image is a plurality of frames in a motion picture.

* * * * *